(12) United States Patent
Minarovic

(10) Patent No.: US 6,538,446 B2
(45) Date of Patent: Mar. 25, 2003

(54) CLOSURE GUARD WITH ELECTRONIC MARKER AND PERFORATED CARRIER SHEET

(76) Inventor: Joe T. Minarovic, 201 Logan Ranch Rd., Georgetown, TX (US) 78628

( * ) Notice: Subject to any disclaimer, the term of this patent is extended or adjusted under 35 U.S.C. 154(b) by 0 days.

(21) Appl. No.: 09/887,859

(22) Filed: Jun. 22, 2001

(65) Prior Publication Data

US 2001/0043071 A1 Nov. 22, 2001

Related U.S. Application Data

(63) Continuation-in-part of application No. 09/417,960, filed on Oct. 13, 1999, now Pat. No. 6,271,667, which is a continuation-in-part of application No. 09/165,402, filed on Oct. 2, 1998, now Pat. No. 6,133,738.

(51) Int. Cl.[7] .............................. G01V 3/08; G01V 3/11; G01V 15/00; F16L 57/00
(52) U.S. Cl. ........................ 324/326; 116/209; 405/157
(58) Field of Search ................................. 324/326–329, 324/67; 116/209; 174/37; 340/572.5, 572.8, 572.9; 405/157

(56) References Cited

U.S. PATENT DOCUMENTS

| | | | | |
|---|---|---|---|---|
| 3,568,626 A | * | 3/1971 | Southworth, Jr. | |
| 4,119,908 A | * | 10/1978 | Cosman et al. | ............ 324/67 X |
| 4,767,237 A | * | 8/1988 | Cosman et al. | ............. 405/157 |
| 4,781,958 A | * | 11/1988 | Gilbert | ................... 405/157 X |
| 5,045,368 A | * | 9/1991 | Cosman et al. | ......... 405/157 X |
| 5,200,704 A | * | 4/1993 | Clark, Jr. et al. | ............ 324/326 |

* cited by examiner

Primary Examiner—Gerard R. Strecker
(74) Attorney, Agent, or Firm—Jack V. Musgrove

(57) ABSTRACT

A buried closure guard has an electronic transponder attached to a flat, perforated carrier sheet constructed of a flexible polymer. Holes in the carrier sheet, which serve to anchor the guard, preferably have an effective diameter of at least about 1½" to allow typical backfill materials to pass through. By providing a webbed carrier, any protrusion of a digging tool (such as teeth on a backhoe bucket) will catch on one of these holes and pull at the carrier to make it further visible during excavation. The perforated construction of the sheet allows backfill material to settle and pass through the carrier without significantly shifting or bending the carrier. The carrier also makes it easy to manually deploy the transponder, i.e., maintain a proper horizontal orientation of the transponder coil. The transponder can be attached to the carrier sheet in a number of ways, particularly by affixing the transponder to a central portion of the carrier sheet using a mechanical, heat (fusion), or adhesive bond.

15 Claims, 2 Drawing Sheets

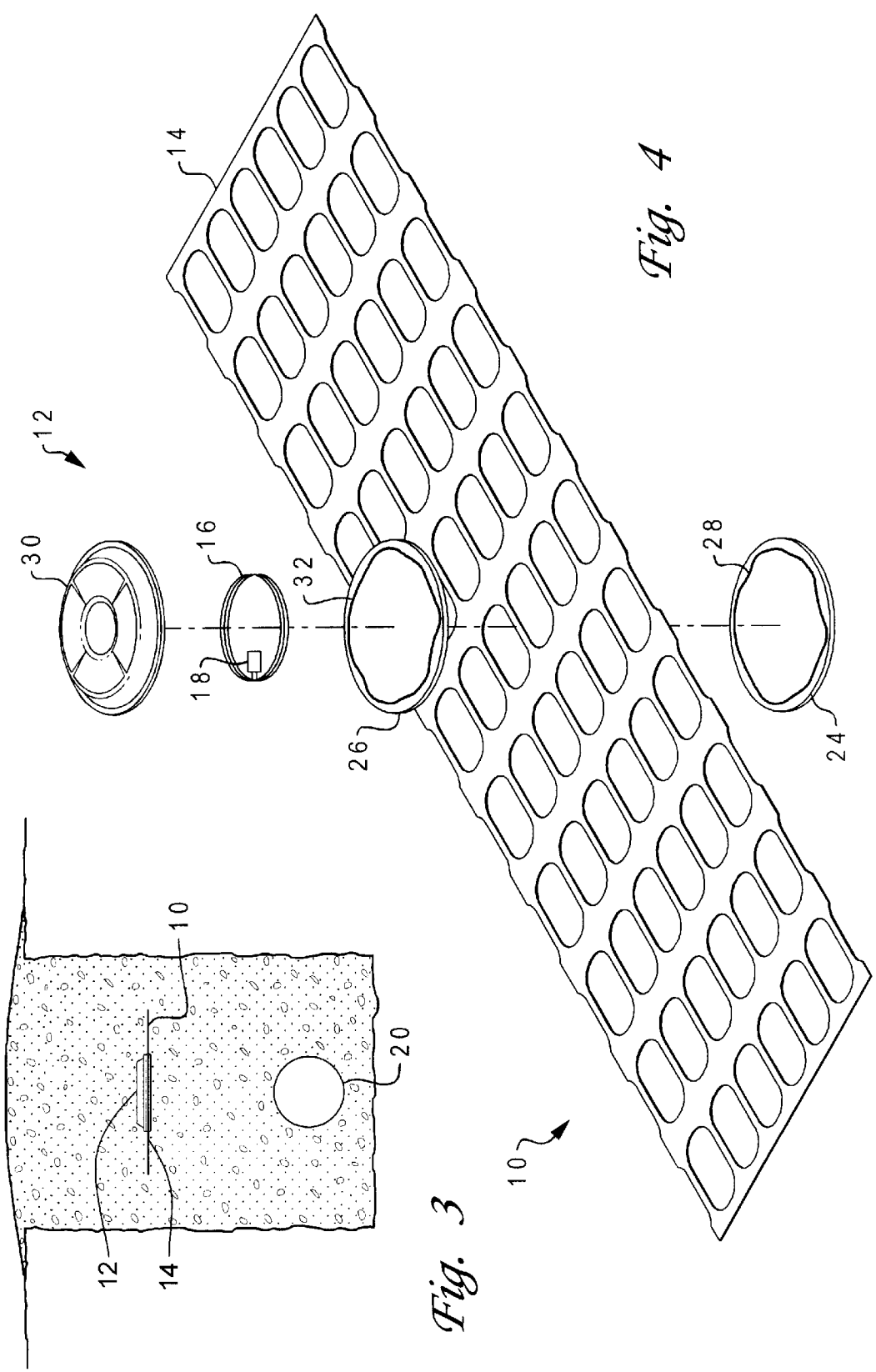

US 6,538,446 B2

CLOSURE GUARD WITH ELECTRONIC MARKER AND PERFORATED CARRIER SHEET

CROSS-REFERENCE TO RELATED APPLICATION

"This application is a continuation-in-part of U.S. patent application Ser. No. 09/417,960, filed on Oct. 13, 1999, now U.S. Pat. No. 6,271,667, which is a continuation-in-part of copending U.S. patent application Ser. No. 09/165,402, filed on Oct. 2, 1998, now U.S. Pat. No. 6,133,738."

BACKGROUND OF THE INVENTION

1. Field of the Invention

The present invention generally relates to devices used to electromagnetically mark and locate obscured objects, and more particularly to a digging guard adapted to visually mark a buried object, such as a splice closure, which also provides a transponder or marker to enable the later location of the buried closure.

2. Description of the Related Art

Buried conduits are employed for supplying a wide variety of utilities, including pipelines for gas, water and sewage, and cables for telephone, optical fiber, power and television. It often becomes necessary to locate defective or damaged cables, pipes, etc., in order to repair or replace them or to quickly locate a buried, high-pressure gas valve. Conversely, it is important to know with as much accuracy as possible the approximate vicinity of such items in order to avoid disturbing them when digging or excavating for other purposes, such as emergency situations. Above-ground marking devices may be installed immediately after the conduit is buried, but they are often lost, stolen, or destroyed after a short period of use. Therefore, it is common to use underground marking devices or systems to enable the later location of a section or feature of an underground utility.

In the past, three different approaches have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot distinguish the trace wire from any other conductor in the vicinity. Marking of the path still does not identify specific components, like valves or splices.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means. See generally, U.S. Pat. No. 5,045,368.

FIG. 1 illustrates several kinds of passive transponders for different applications. These include a small, near-surface marker 2 for locating a valve box, a medium size or mid-range marker 4 for locating a service drop (a loose coil of cabling deployed for future use), a full-range marker 6 for locating a more deeply buried conduit stub, and a so-called ball marker 8 for locating a conduit tee. The latter marker provides a spherical housing which supports the marker coil horizontally, regardless of the orientation of the housing (i.e., self-leveling), and is used for soil conditions which may result in significant shifting of the housing, such that the marker always provides a vertical location beacon (inductor axis). These markers simply "float" around the underground feature in the soil, and are subject to soil movement. They all have a relatively minimal profile.

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection.

While several of the foregoing articles can be used to alert an excavation team that a buried object is nearby, there continue to be problems regarding both locating and damaging the cables or conduits. Even with correct placement procedures, movement can occur in a filled ditch or hole as a result of loose unpacked soil, freeze/thaw cycling, water erosion, and other causes. These conditions can cause a marker to become oriented at a different axis with respect to the vertical, which usually results in a mislocate of the obscured object. Self-leveling markers are available, but the self-leveling construction adds significant expense to the product. The self-leveling markers (such as the ball marker 8) also provide no expansive visual indication to the excavation team, i.e., if the backhoe or other mechanical digger excavates the site, then by the time the ball marker is seen, the backhoe blade is already dangerously near the marked object (the ball marker is only about the size of a grapefruit). It is possible that the backhoe would scoop up the ball marker in a load of dirt without even being noticed by the operator. While marker tape offers a more expansive visual indication, there is still no guarantee that the backhoe shovel will grab onto the marker tape and reveal it, e.g., if the backhoe blade is thrust at a glancing angle near the edge of the tape.

In light of the foregoing, it would be desirable to devise an improved article for more accurately locating a buried object. It would be further advantageous if the article could provide not only improved electronic locating, but also provide a strong visual indication of the proximity of the object which is easily detected by an excavator.

SUMMARY OF THE INVENTION

It is therefore one object of the present invention to provide an improved article for deploying an electronic transponder used to locate a buried or otherwise obscured object.

It is another object of the present invention to provide such an article that allows accurate orientation of the transponder.

It is yet another object of the present invention to provide such an article which is highly visible and easily detected during excavation, so as to avoid damage to the buried object that might otherwise occur while digging.

The foregoing objects are achieved in a buried closure guard, generally comprising an electronic transponder, and a generally flat, perforated carrier sheet constructed of a flexible polymer. In one embodiment, the transponder is generally flat and oriented parallel with the sheet, and is a passive transponder having a resonant LC circuit. The holes in the carrier sheet preferably have an effective diameter of at least about 1½" (the holes can be elongate). The carrier sheet can also be color-coded to indicate a particular utility; e.g., telecommunications. By providing a webbed carrier, any protrusion of a digging tool (such as a backhoe bucket) will catch on one of these holes and pull at the carrier to make it further visible during excavation. The perforated construction of the sheet allows backfill material to settle and pass through the carrier without significantly shifting or bending the carrier. The carrier also makes it easy to manually deploy the transponder, i.e., maintain a proper horizontal orientation of the transponder coil. The transponder can be attached to the carrier sheet in a number of ways, particularly by affixing the transponder to a central portion of the carrier sheet using a cement or adhesive, as well as mechanical attachment or heat (fusion) bonding.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 3 is an elevational cross-section of the marker article of FIG. 2 shown fully deployed, i.e., buried in the cable trench; and FIG. 4 is an exploded perspective view of the marker article of FIG. 2 depicting the manner of attachment of the various components.

The use of the same reference symbols in different drawings indicates similar or identical items.

DESCRIPTION OF THE PREFERRED EMBODIMENT(S)

Figure 1:
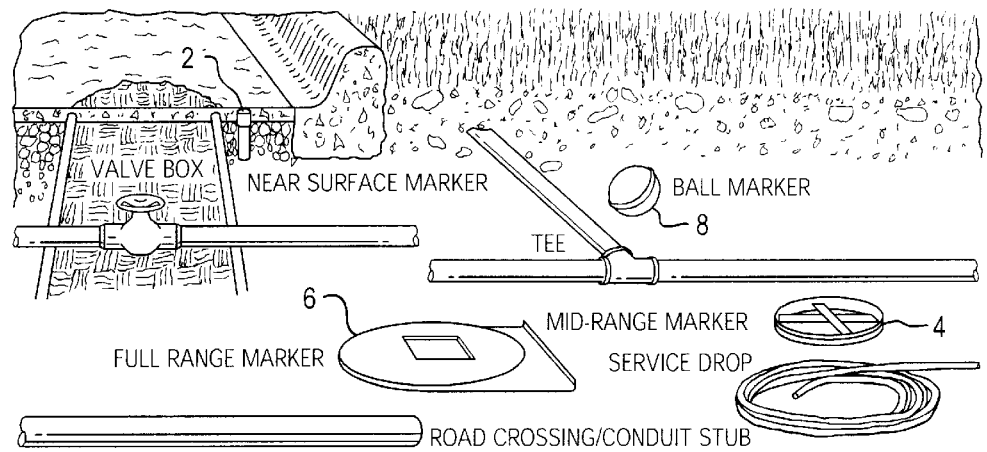
FIG. 1 is a pictorial representation of various underground utility structures which have been marked with electronic transponders to allow conventional location of the structures.
Figure 2:
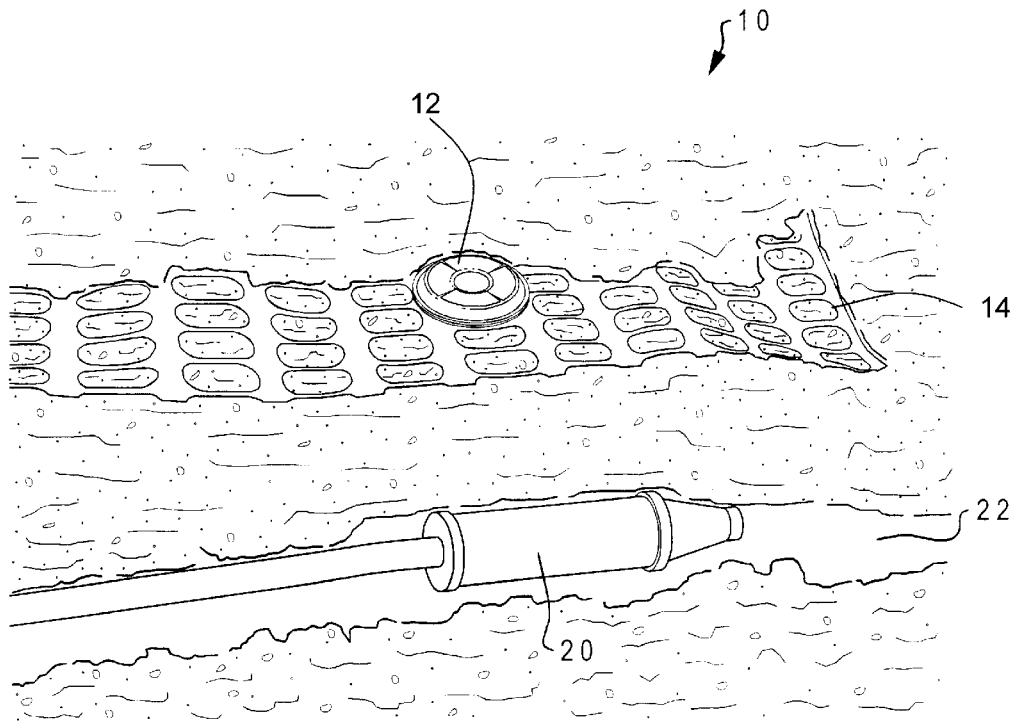
FIG. 2 is a perspective view of one embodiment of the marker article of the present invention shown partially deployed over a buried cable closure during the backfill process.

With reference now to the figures, and in particular with reference to FIGS. 2 and 3, there is depicted one embodiment 10 of a cable closure guard constructed in accordance with the present invention. Closure guard 10 is generally comprised of an electronic marker or transponder 12, and a carrier 14.

The construction of electronic marker 12 may vary considerably depending on, e.g., the size of the cable closure to be located, or the intended depth of burial of the marker. In the illustrative embodiment, electronic marker 12 is a generally disk-shaped, passive electronic marker, about 6" in diameter, and ¾" thick. The interior of electronic marker 12 contains a wire coil 16 and a capacitor 18 (see FIG. 4) electrically connected to form a resonant LC circuit. Marker 12 is thus activated by radiating a signal into the ground in the area where the marker is expected to be found, using an above-ground receiver. Marker 12 accepts energy from the emitted signal within its bandpass and stores it during the transmission cycle and, when the transmission cycle ends, marker 12 re-emits the energy at the marker's resonant frequency. Marker 12 may operate on a standard frequency, e.g., 101.4 kHz for telecommunications industry. While the following description contemplates a passive transponder, the invention could alternatively use an active (i.e., battery-powered), multifunction transponder.

Carrier 14 is a perforated sheet constructed of any durable material, preferably a thermoplastic polymer (injection-moldable or extrudable) such as polyester or high-density polyethylene, or some polymeric blend. Carrier 14 is thin (preferably about 0.040" thick), and flexible. In an exemplary embodiment, carrier 14 is 48" long and 12" wide, and the perforations are elongate holes whose major axis is about 3½" and whose minor axis is about 1½". The holes are separated along their sides by webbed portions of the carrier about 1¼" wide, and along their ends by webbed portions about 1" wide. These dimensions are ideal for allowing typical backfill material to settle and pass through the carrier without significantly shifting or bending the carrier. The holes comprise about 50% of the total area of sheet 14, and provide anchoring for the carrier.

By attaching the electronic marker to a large, flat carrier, it becomes easier for field crews to place the assembly in the required horizontal position. FIG. 2 shows a closure 20 as typically installed, in a relatively horizontal position. Closure 20 secures a repaired or spliced portion of an underground cable 22. Cable 22 may be, e.g., fiber optic or copper wire for telecommunications, or a power (high-voltage) cable. The carrier is stretched out above the closure, and its lengthwise axis can be aligned with the axis of the closure. It may be placed, e.g., 1' above buried closure 20 (the use of cable ties is optional). Because of the relative size of the carrier, it can be manually leveled (by eye) with the cable/closure 20, to within an inch on either end, yielding only a minor deviation in any angular positioning of marker coil 16. The large carrier also serves as an anchor, and helps prevent the marker from slipping during backfilling, which can easily happen with markers that are not supported by a carrier.

In addition to marking and shielding the closure, closure guard 10 acts as a visible anti-dig warning device. It is preferably colored according to the type of utility being marked, e.g., orange for a guard covering a closure for a telecommunications cable. This application is particularly advantageous in use with splice closures which may frequently be re-entered to provide additional branch circuits, another service, or because of later problems with the seal provided by the closure. This embodiment is also useful in locating emergency shut-off valves for, e.g., gas mains. The bright orange digging shield alerts the digger of the close proximity of the closure, and protects the closure from inadvertent damage during excavation as it is difficult to cut through. After the carrier is identified, the excavation team can hand-dig to the closure.

Whether the digging tool is a backhoe, shovel, fork or pick, the construction of carrier 14 makes it more likely that closure guard 10 will be noticed during excavation. By providing holes/webbing in carrier 14, any protrusion on the backhoe shovel will catch on one of these holes and then pull at carrier 14, rather than just scraping against its surface. While it could be elastic, the material of carrier 14 is preferably plastic, i.e., stretchable so that, as the backhoe pulls at one of the perforations, that portion of the carrier deforms even if the remainder of the carrier is tightly wedged in the soil. The material of carrier 20 preferably has an elongation of at least 200%.

FIG. 4 illustrates one manner of attaching marker 12 to carrier 14. Depending upon the particular polymer selected for carrier 14, it may be difficult to directly bond the marker to the carrier. Accordingly, the carrier may be attached by indirectly securing it between a pair of pads or disks 24, 26. A small amount of, e.g., ABS cement 28 is applied to disk 24, which is then pressed against the bottom surface of carrier 14 as disk 26 is pressed against the top surface of the carrier at the same location. The adhesive material secures the two disks together and, thereby, secures carrier 14 as well. A dome or lid 30 is then affixed to the other side of disk 26 using another application of cement 32, with the marker coil being located inside the lid. Other attachments techniques could be used, such as thermal bonding. The marker is generally placed at the center of the carrier.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the disclosed guard is adapted for use with a cable closure, an alternative embodiment might be designed for use with a conduit joint or tee wherein the conduit is used for, e.g., water, sewage, or natural gas. It is therefore contemplated that such modifications can be made without departing from the spirit or scope of the present invention as defined in the appended claims.

What is claimed is:

1. An article for marking an obscured structure, comprising:
   an electronic transponder; and
   carrier means for positioning said electronic transponder at a predetermined location and orientation with respect to the obscured structure, said carrier means including a perforated sheet having a plurality of holes which have an effective diameter of at least about 1½".

2. The article of claim 1 wherein the obscured structure is a cable closure having a cross-section and length, and said carrier means includes a sheet having an area larger than the cross-section of the cable closure, and a length longer than the length of the cable closure.

3. The article of claim 1 wherein said carrier means is color-coded to indicate a utility associated with the obscured structure.

4. The article of claim 1 wherein said sheet is constructed of a thermoplastic polymer.

5. The article of claim 1 wherein said transponder is placed at a center of said sheet.

6. The article of claim 4 wherein said sheet is generally flat and formed of a flexible material.

7. The article of claim 6 wherein said transponder is generally flat and oriented parallel with said sheet.

8. The article of claim 1 wherein said transponder is a passive transponder.

9. A buried closure guard comprising:
   an electronic transponder;
   a generally flat, perforated carrier sheet constructed of a flexible polymer, said carrier sheet having a plurality of holes, each of said holes having an effective diameter of at least about 1½"; and
   means for attaching said transponder to said carrier sheet.

10. The buried closure guard of claim 9 wherein the holes in said carrier sheet are elongate.

11. The buried closure guard of claim 9 wherein said carrier sheet is color-coded to indicate a utility.

12. The buried closure guard of claim 9 wherein said transponder is generally flat and oriented parallel with said sheet.

13. The buried closure guard of claim 9 wherein said flexible polymer of said carrier sheet has an elongation of at least 200%.

14. The buried closure guard of claim 9 wherein said transponder is a passive transponder having a resonant LC circuit.

15. The buried closure guard of claim 9 wherein said attaching means permanent affixes said transponder to said carrier sheet.

* * * * *